Sept. 3, 1929.  E. R. BARRETT  1,726,797
HOISTING MECHANISM
Filed Dec. 21, 1928  3 Sheets-Sheet 1

Sept. 3, 1929.  E. R. BARRETT  1,726,797
HOISTING MECHANISM
Filed Dec. 21, 1928    3 Sheets-Sheet 2

Inventor
Edward R. Barrett
By Liverance & Van Antwerp
Attorneys

Sept. 3, 1929. E. R. BARRETT 1,726,797
HOISTING MECHANISM
Filed Dec. 21, 1928   3 Sheets-Sheet 3
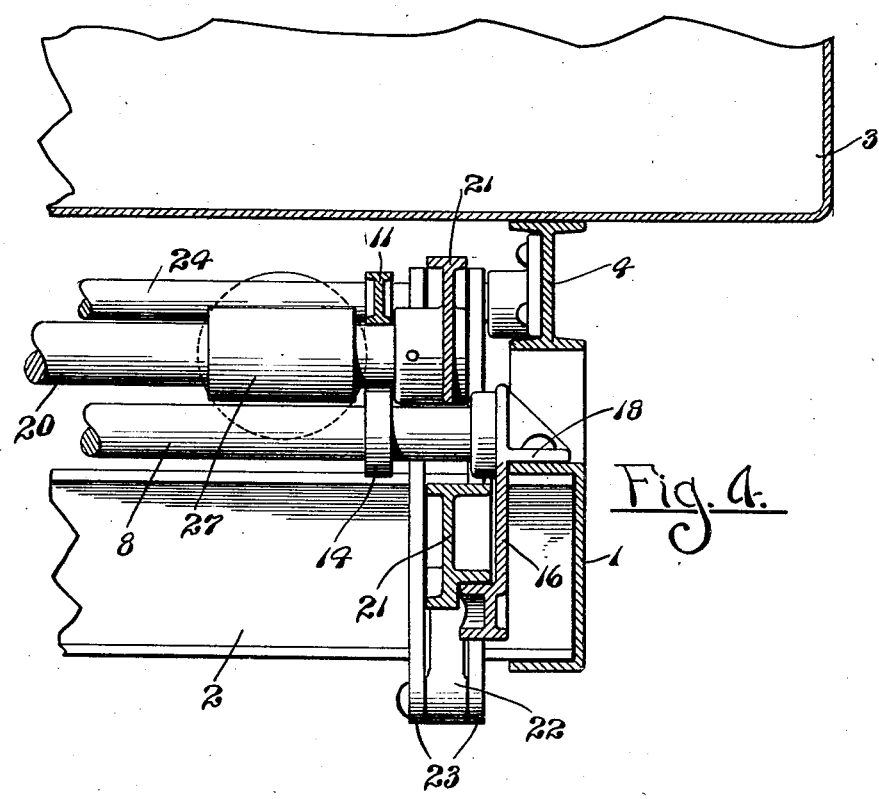
Fig. 4.
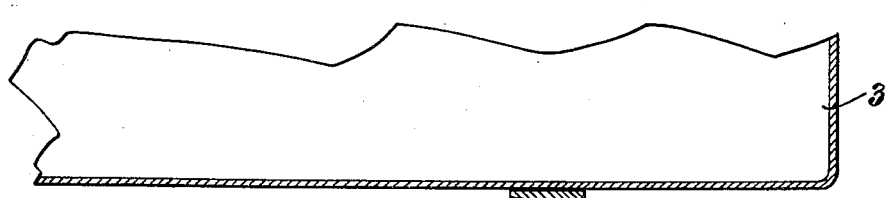
Fig. 5.
Inventor
Edward R. Barrett
By Liverance &
Van Antwerp
Attorneys
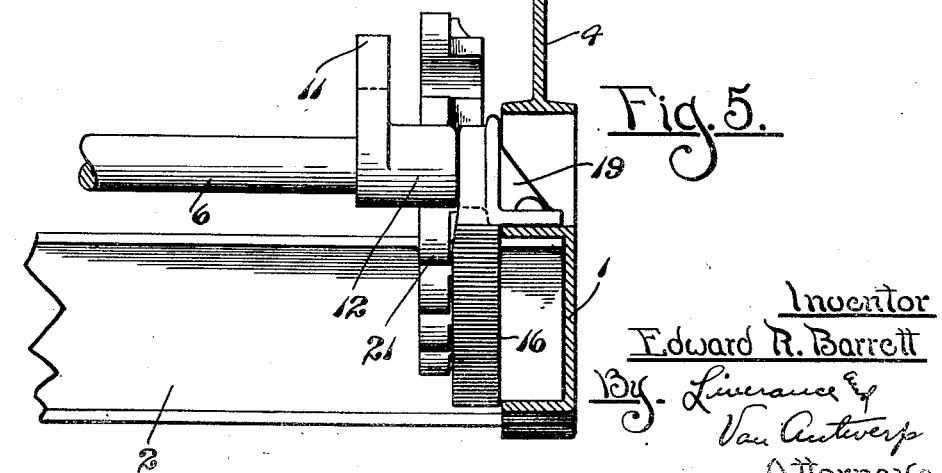

Patented Sept. 3, 1929.

1,726,797

UNITED STATES PATENT OFFICE.

EDWARD R. BARRETT, OF DETROIT, MICHIGAN, ASSIGNOR TO WOOD HYDRAULIC HOIST & BODY COMPANY, OF DETROIT, MICHIGAN, A CORPORATION OF MICHIGAN.

HOISTING MECHANISM.

Application filed December 21, 1928. Serial No. 327,701.

This invention relates to dumping apparatus for dumping bodies on trucks and is particularly concerned with a novel construction of hydraulic dumping unit to be applied between a motor truck chassis and a body tiltably mounted thereon for tilting the body between its horizontal position and upper inclined load discharging position.

The chassis trucks to which the dumping apparatus is applied are of various widths requiring that the elements of the unit be located varying distances apart. With the present invention a unit which is practically universally applicable to all the different widths of chassis frames of trucks which the unit will serve is provided, the unit being shipped directly from the factory to the truck manufacturer and very quickly and easily applied thereto. The only change, if any, that is necessary in the various units resides in different lengths of cross members which are of cylindrical form and may be very readily cut to the desired lengths for different trucks.

It is a primary object and purpose of the present invention to provide a hydraulic dumping body unit of the character set forth and to further provide a very practical and economically manufactured dumping unit and one which is very durable and efficient in service.

Figure 1:
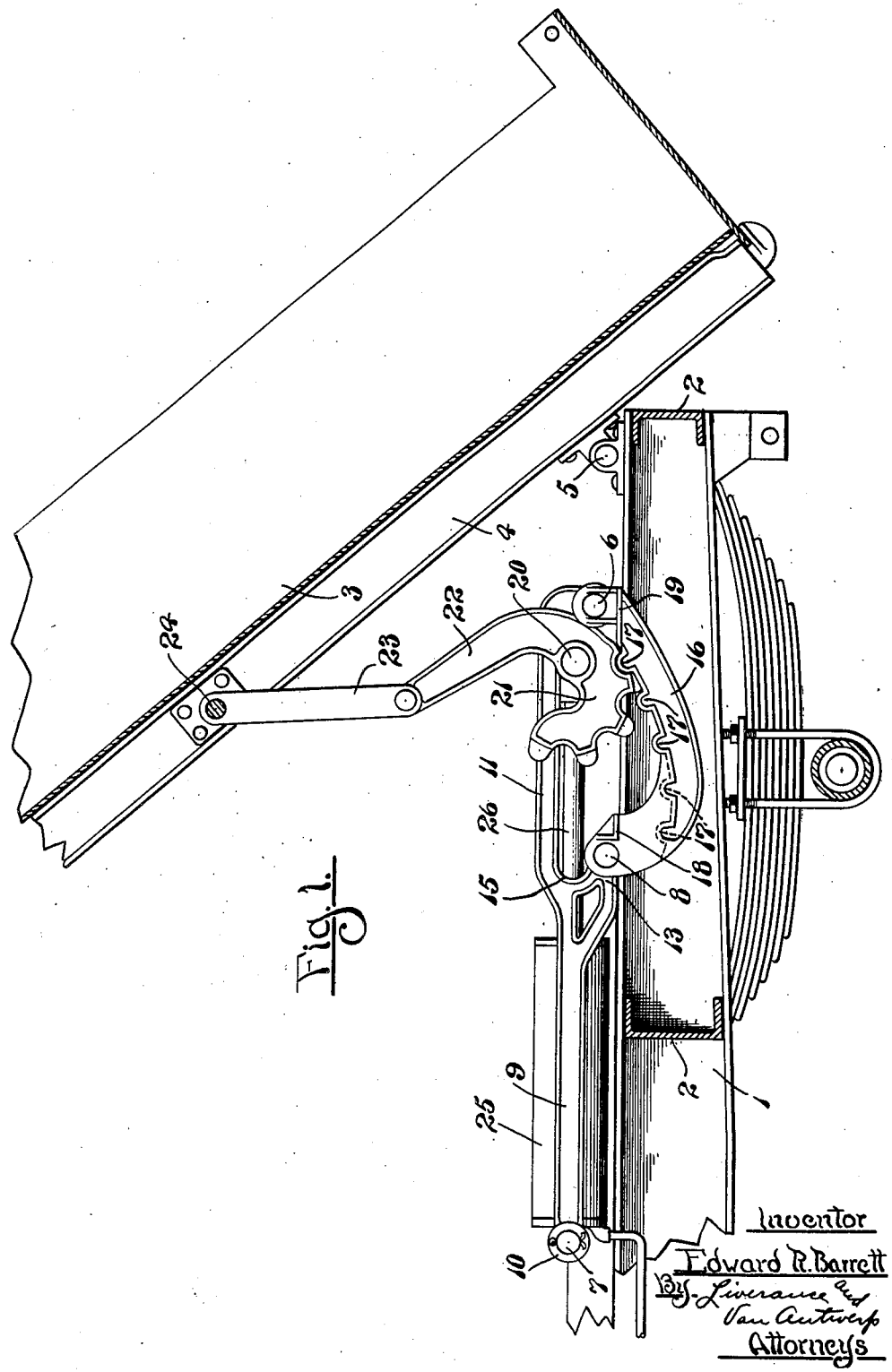

An understanding of the invention for the attainment of the ends stated may be had from the following description taken in connection with the accompanying drawings, in which, Fig. 1 is a fragmentary longitudinal section thru a chassis frame having a dumping body tiltably mounted thereon, the hydraulic dumping unit of my invention being shown in side elevation between the chassis and body.

Figure 2:
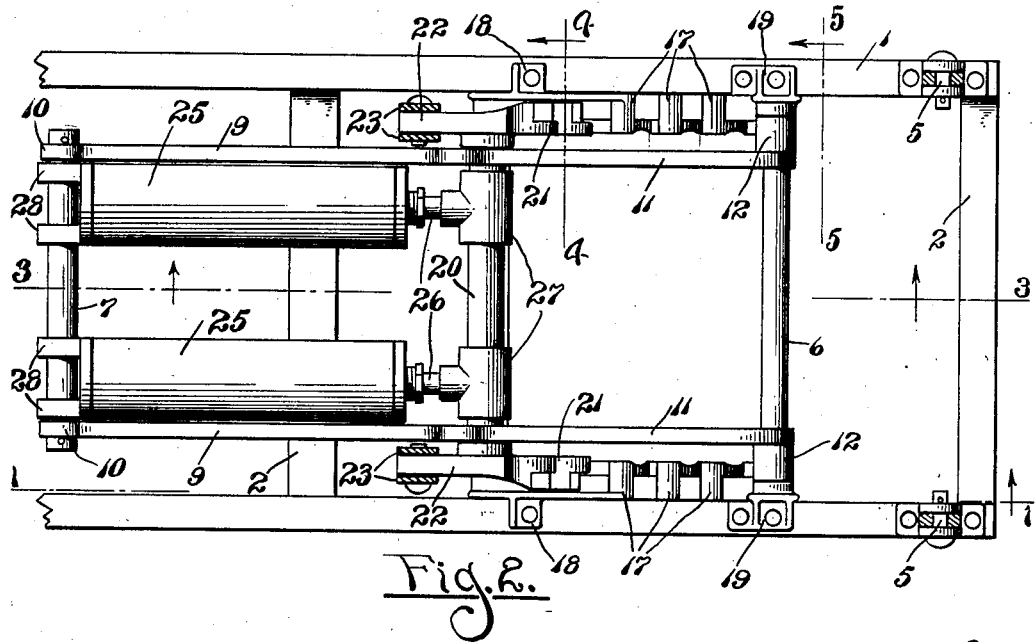

Fig. 2 is a plan view of the unit and the chassis to which it is attached.

Figure 3:
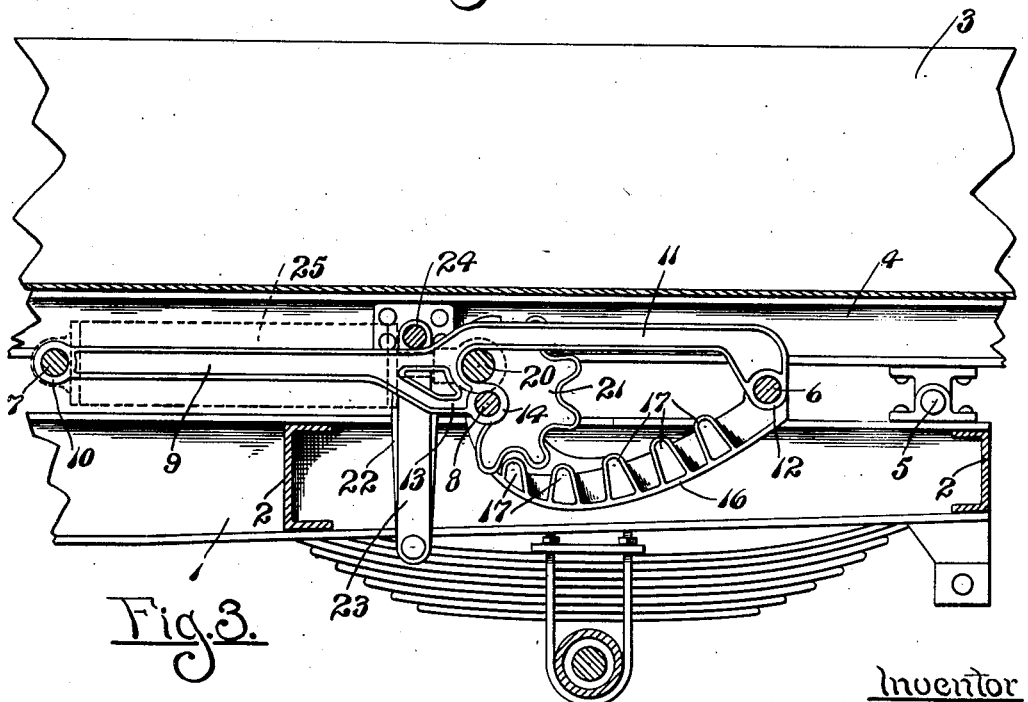

Fig. 3 is a fragmentary enlarged vertical section through the chassis and body and the dumping unit between the same, with the body in horizontal position, the plane of the section being on the line 3—3 of Fig. 2, and Figs. 4 and 5 are fragmentary enlarged transverse vertical sections substantially on the planes of lines 4—4 and 5—5, respectively, of Fig. 2, Like reference characters refer to like parts in the different figures of the drawings.

The truck chassis frame is of usual construction having spaced apart side members 1 connected by cross bars 2 usually of channel form. The body 3 located above the chassis frame may be of any desired construction carried on longitudinal sills 4 which are tiltably mounted near the rear end of the frame on horizontal pivots 5 whereby the body may be moved between its normal horizontal position and an upper inclined dumping position.

In the construction of the unit which is interposed between the chassis frame and body 3, horizontal rods 6, 7 and 8 are used the same being spaced apart, the rod 6 located at the rear end of the unit, rod 7 at the front end and rod 8 intermediate the ends thereof. These rods may be of any suitable construction either solid or tubular as the case may require. Two horizontal side members spaced apart from each other are used in the construction, each comprising a forward section 9 formed with a collar 10 at its front end, a rear section 11 turned downwardly at its rear end and formed with a collar or bearing 12 and, between its ends at its under side, having a downwardly and rearwardly extending short arm 13 which terminates in a collar 14. The rear section 11 lies above the arm 13 and there is formed a seat or socket 15 where the section 11 and the arm 13 join, as best shown in Fig. 1.

The front rod 7 passes through the collars 10 at the front ends of the side members. The rear rod 6 likewise passes through the collars 12 and the intermediate rod 8 through the collars 14. Said rods pass freely through said collars and for the purpose of holding the front rod 7 from endwise movement it may be equipped with retaining devices such as cotter pins, shown in Fig. 1, to prevent such movement. The ends of the rods 6 and 8 extend beyond the collars 12 and 14 through which they pass, on which are mounted rack members 16 which extend from the rod 6 downward and forward and thence upward to the rod 8, as fully appears in Figs. 1 and 3. The rack members 16 are formed with spaced apart teeth 17 integrally cast therewith and located at the upper side of said members. These rack members adjacent their front ends are provided with laterally extending brackets 18 and at their rear ends with laterally extending brackets 19 which lie over and may be permanently secured to the chassis side frame members 1 at the upper sides thereof. This connection of the rack members to the chassis frame members is the only connection of the unit required to the chassis of the truck.

At the cross head shaft 20 is located transversely of and underneath the rear sections 11 of the side members of the unit and in its forward position is received in the sockets 15. At each end of the cross head a segment 21 is mounted. Each of the rack members 16 has associated with it one of the segments 21 to ride thereover. The segments 21 are located to one side of the cross head shaft 20 while integral therewith and extending to the opposite side is an arm 22 located with respect to the segment, as best shown in Fig. 1. A pair of links 23 are pivotally connected at one end to the free end of each arm 22 and at their opposite ends have pivotal connection with a shaft or rod 24 lying between the sills 4 on which the body is mounted.

The movement of the cross head with the connected segment members back and forth over the racks 17 is preferably accomplished by a hydraulically operated apparatus. As shown, two cylinders 25 are located horizontally between the front rod 7 and the cross head shaft 20 having pistons within the same from which piston rods 26 extend through the rear ends of the cylinders and are connected to suitable couplings 27 on the shaft 20. The front ends of the cylinders are equipped with ears 28 through which the rod 7 passes. While two of the cylinders 25 are shown it is to be understood that the number of cylinders used is in no way any part of the present invention and that in many instances one cylinder only will be used, and that if the circumstances warrant it even a greater number of cylinders than the two shown could be used without in any manner changing the invention.

The cylinders receive a liquid, usually oil, which is pumped thereinto at one end and exhausted from the other, thereby moving the pistons and piston rods back and forth with respect to the cylinders. On rearward movement of the pistons the segments are turned from the position shown in Fig. 3 to that shown in Fig. 1 with a resultant movement of the body 3 from horizontal position to tilted position. In practice the extreme tilted position is substantially 55° to the horizontal though of course this can be varied as desired. The cross head shaft 20 rides underneath the rear sections 11 of the side members of the units and thereby maintains the segments 21 in association with the racks.

The dumping unit described may be made in varying width by merely altering the lengths of the cross rods 6, 7 and 8, thereby making the same available for different spacings of the side chassis frame members 1 of motor vehicle trucks. It is evident that this is a very practical construction and one which is very economical in the matter of production manufacture for installation on the different designs of trucks on which devices of this kind are used. The construction has proved very practical and serviceable. The invention is defined in the appended claims and is to be considered comprehensive of all forms of structure coming within their scope.

I claim:

1. A hydraulic dumping unit comprising, two spaced apart horizontal side bars, each of said bars at its under side and between its ends having a downwardly and rearwardly extending arm, collars at each end of said bars and at the free ends of said arms, cross rods extending through said collars, racks mounted on the ends and extending between the intermediate and rear cross rods, a cross head shaft located under the rear portions of said side bars, a gear segment mounted at each end of the shaft to mesh with said racks, each of said gear segments having an arm positioned substantially vertical when the cross head shaft is at its forward position, and hydraulic means connected with said shaft and with the front cross rod for moving the shaft backward and forward underneath said side bars.

2. A hydraulic dumping unit comprising, spaced apart horizontal side bars, each at its under side and between its ends having a downwardly and rearwardly extending arm, front, rear and intermediate cross members connecting the front and rear ends of the side bars and the ends of said arms, racks mounted on and extending between said intermediate and rear cross members outside of said side bars, a cross head shaft extending under the rear portions of said side bars and movable backward and forward, in its frontmost position passing above said arms, a segment mounted on each end of the shaft to engage with said racks, each of said segments having an arm extending therefrom which is positioned substantially vertically in the forward position of the shaft, and hydraulic means carried by the front cross members and said shaft for moving the shaft backward and forward.

3. A hydraulic dumping unit comprising, spaced apart horizontal side bars, said side bars at their rear portions being located in a plane above the front portions thereof, front, rear and intermediate cross members passing through said side bars whereby the same may be positioned on the cross members different distances apart, racks one at each side of the unit extending between and connected with said rear and intermediate cross members at the ends thereof, a cross head shaft extending transversely of and underneath the rear raised portions of the side bars, gear segments mounted at the ends of the shaft meshing with said racks, each of said segments having an arm extending forwardly and thence substantially vertically downward from the segment when it is in its foremost position, and hydraulic means connected with said shaft and carried between the same and the front cross member for moving the shaft and attaching segments from front to rear and vice versa.

4. In combination with a truck frame having a dumping body tiltably mounted thereon, a rack secured to each side of the frame, a rear cross member extending between the rear ends of the rack, an intermediate cross member extending between the front ends of the racks, spaced apart horizontal side bars mounted on said cross members and extending in front of said intermediate cross member, a front cross member between the front ends of said side bars, a cross head shaft located transversely of and passing underneath the side bars, a gear segment on each end of the shaft meshing with the rack, connections between the gear segments and the body for tilting the same upwardly on rearward movement of said shaft, and hydraulic means associated with said shaft and carried between the same and the front cross member for moving said shaft from front to rear and vice versa.

5. A hydraulic dumping unit comprising, two spaced apart parallel side bars, each having a forward section and a rear section located in a plane above the forward section and each having a downwardly and rearwardly extending arm at its under side at the junction of said sections, cylindrical cross members passing through said side bars at their front and rear ends and through the free ends of said arms, racks mounted at each side of said unit on the ends of the rear and intermediate cross members, a cross head shaft located transversely of and under the rear raised portions of the side bars adapted in its forward position to pass above said arms and be received in sockets formed between said arms and the front end portions of the rear raised parts of the side bars, segments mounted one at each end of the cross head shaft meshing with said racks, each of said segments having an arm extending therefrom so as to lie substantially vertical when the shaft is in its forward position, a horizontal cylinder mounted at its front end on the front cross member, and a piston rod extending through its rear end having connection with said shaft.

6. A hydraulic dumping body unit comprising, spaced apart horizontal side bars, front, rear and intermediate cross members of cylindrical form passing freely through said cross bars at their front and rear ends and at points intermediate said front and rear ends, racks one at each side of said units mounted on and extending between the rear and intermediate cross members, gear segments mounted on said racks, a cross head shaft on the ends of which said gear segments are mounted passing transversely underneath the side bars and movable from front to rear under the rear portions of said side bars, each of said gear segments having an arm thereon extending downwardly in a substantially vertical position when said shaft and segments are at their extreme forward position, a hydraulic cylinder mounted at its front end on the front cross member, and a piston rod extending through its rear end connected with said shaft.

In testimony whereof I affix my signature.

EDWARD R. BARRETT.